Nov. 6, 1973   J. B. ATENDIDO ET AL   3,770,635
SUBMERSIBLE MOTOR SEAL FLUID AND SECTION
Filed Jan. 24, 1972

United States Patent Office 3,770,635
Patented Nov. 6, 1973

3,770,635
SUBMERSIBLE MOTOR SEAL FLUID
AND SECTION
Jorge B. Atendido, St. Paul, and Robart L. Hansen, Roseville, Minn., assignors to Minnesota Mining and Manufacturing Company, St. Paul, Minn.
Filed Jan. 24, 1972, Ser. No. 220,353
Int. Cl. C10m 1/38
U.S. Cl. 252—48.6                                   6 Claims

ABSTRACT OF THE DISCLOSURE

A seal section for a submersible pump motor filled with a lubricating and cooling fluid comprising a solution of a fluoroaliphatic radical-substituted polymer in a normally liquid fluorinated solvent, which seal section prevents ingress of ambient well fluid into the motor along an operating shaft and also accommodates expansion and contraction of the volume of said fluid due to on-and-off cycling of the motor.

---

Figures 1, 2:
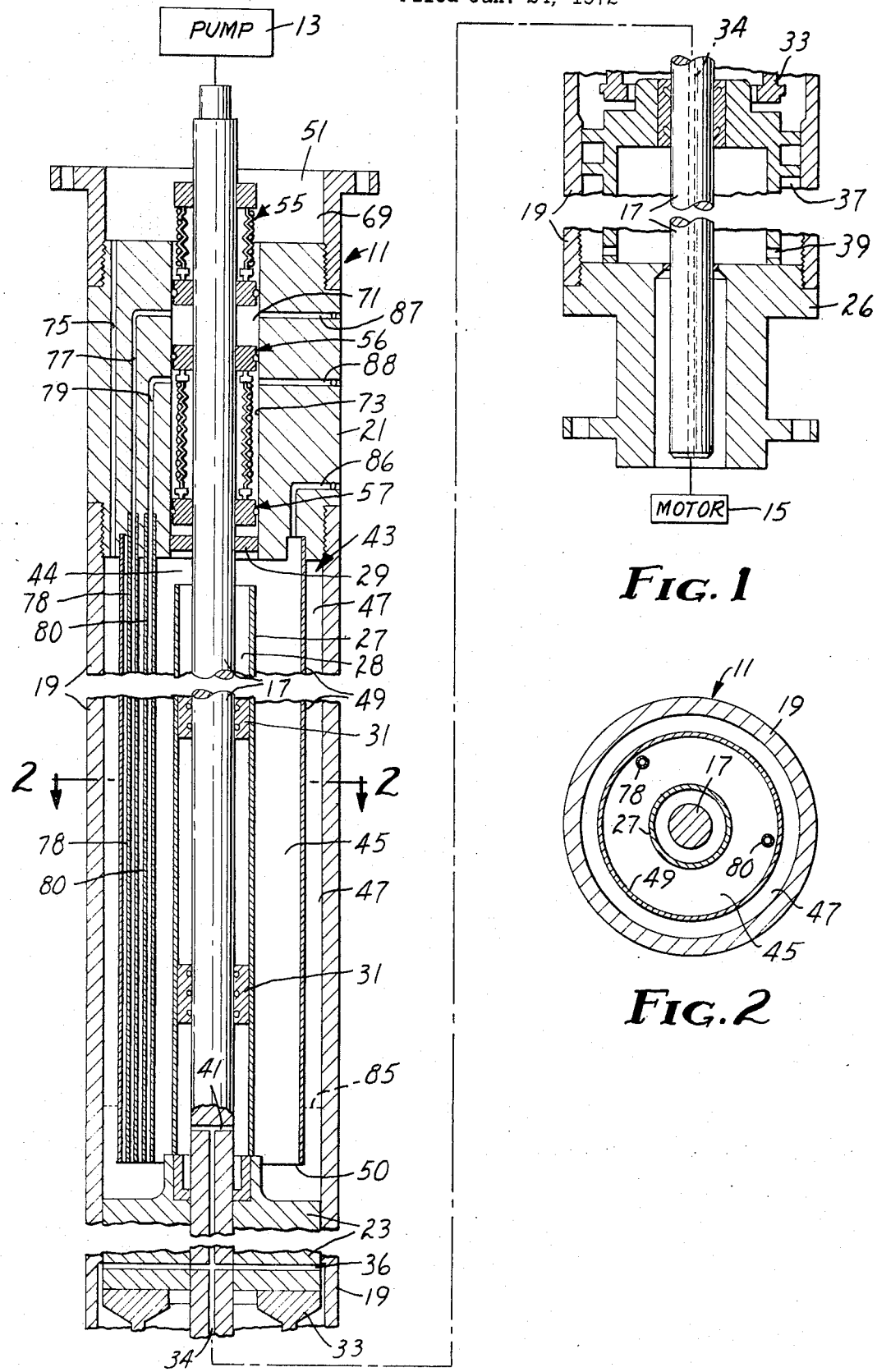

This invention relates to submersible type seal section for a submersible motor driving a submersible pump. In another aspect, it relates to a fluid useful in lubricating and cooling said motor and for preventing or minimizing the ingress of ambient well fluid into said motor.

There are many uses for submersible motor and pump units such as pumping fluid from deep oil or water wells. Generally, electric motors having these submersible motor and pump units are filled with a fluid which serves both as a coolant and as a lubricant for the moving parts of the motor. A seal section is interposed between the motor and pump for retaining this fluid within the motor and for preventing the ambient well fluid from entering the motor as well as accommodating volume changes in the motor fluid caused by on-and-off cycling.

Seal sections of this type are disclosed in U.S. Pat. 3,182,214 (Boyd, issued May 4, 1965) and U.S. Pat. No. 3,502,919 (Boyd et al., issued Mar. 24, 1970). In the sections described in those patents, an intermediate fluid, such as water, is interposed between the ambient well fluid and the motor lubricating and cooling fluid to prevent or minimize the mixing of the ambient well fluid with the motor fluid. While seal sections of this type have enjoyed some commercial success, they have not been as satisfactory as desired. If the shaft rotary seals become worn or eroded, well fluid (containing brine) leaks through the seals and the leaked brine, being denser than the motor fluid (a hydrocarbon oil), comes directly in contact with the motor windings and short-circuits the electrical system of the motor.

Briefly, according to this invention, a seal section, such as that similar to the seal sections disclosed in said U.S. Pat. Nos. 3,182,214 and 3,502,919, is provided by using a novel fluid which functions both as a motor lubricating and cooling fluid and as the fluid which separates the motor from the ambient well fluid. (Said novel fluid is hereinafter referred to occasionally as "motor fluid" for purposes of brevity.) Said motor fluid comprises a solution of a fluoro-aliphatic radical-substituted polymer in a normally liquid fluorinated solvent.

The motor fluid of this invention has a density greater than that of the well fluid (and even if leakage occurs in the shaft rotary seals, the well fluid will not come into contact with the motor) and it is insoluble in and chemically resistant to brine and motor oil, electrically nonconducting even in contact with brine, compatible with construction materials, including plastics and metals, used in the motor, has a high enough viscosity to lubricate the moving parts of the motor and seal section shaft and sufficiently fluid to act as an efficient heat transfer medium, and it is thermally stable under the operating conditions encountered by the submersible pump motor. The novel motor fluid has a viscosity at 100° C. which remains substantially constant at 2 to 5 centipoises when it is heated in air for 150 hours at 125° C. and thus functions effectively as a motor lubricating and cooling medium during on-off cycles of the motor.

In the accompanying drawing, FIG. 1 is a schematic view in elevation and partial section of one embodiment of the submersible pump motor seal section of this invention and FIG. 2 is a cross-section of FIG. 1 taken along the plane 2—2.

The solvent used in the motor fluid of this invention is a stable, inert, normally liquid non-polar, oleophobic and hydrophobic, highly fluorinated organic compound and preferably a mixture of such compounds. The fluorinated solvent can be straight chained, branched, or cyclic, or a combination thereof, such as alkylcycloaliphatic, and is saturated, that is, free of ethylenic, acetylenic, and aromatic unsaturation. The skeletal chain of the fluorinated solvent can include catenary oxygen and/or trivalent nitrogen hetero atoms bonded only to carbon atoms, such hetero atoms providing stable linkages between fluorocarbon groups and not interfering with the inert character of the compound. The fluorinated solvent has a large number of carbon atoms, i.e., at least 10, the maximum number of carbon atoms being dictated by viscosity considerations. The fluorinated solvent has a viscosity at 100° C. of usually less than 3 centistokes. Fluorocarbon (free of catenary hetero atoms) can be used as solvents provided they have no more than about 20 carbon atoms since those with a greater number of carbon atoms have too high a melting point and too high a viscosity to be useful per se as solvents. Fluorocarbon ethers can be used as solvents, these solvents having as many as 750 or more carbon atoms. Generally, the fluorinated solvent of this invention will contain about 50–76 wt. percent carbon-bonded fluorine. The fluorinated solvent can contain some hydrogen or chloride, i.e. less than about 10 atom percent on the basis of fluorine content, but is preferably substantially completely fluorinated. The fluorinated solvents have a minimum boiling point about 120° C., and correspond in this respect to a $C_{10}$ or higher fluorinated compound.

Mixtures of fluorinated solvents are available. It will generally be necessary to stabilize such mixtures before using the same as solvents. Stabilization of such mixtures can be affected by heating to reflux temperature or to about 150° C. in the presence of solid KOH.

U.S. Pats. 3,250,807, 3,250,808, and 3,274,239 disclose fluorinated oils, made by polymerization of perfluoropropylene oxide, which can be stabilized, e.g. as disclosed in U.S. Pats. 3,214,478, 3,242,218 and 3,342,875, to provide said fluorinated solvents, said stabilization converting functional or active end groups to inert carbon-bonded hydrogen or fluorine by reaction with fluorinating agents, protic bases, or ultraviolet radiation. U.S. Pats. 2,500,288, 2,519,983, 2,594,272, and 2,616,927 describe the preparation of inert, highly fluorinated compounds, such as hydrocarbons, ethers, and tertiary amines, useful as said fluorinated solvents, said preparation involving electrochemical fluorination in anhydrous HF medium. Commercial fluorinated solvents useful in this invention are the 3M Company's "Fluorinert" liquids, e.g. FC-40, FC-43, and FC-48, described in that company's bulletins Y-ILBG(R)(187-1)RC and Y-IFC-48(60.2)R.

In order to enhance the lubricity of the fluorinated solvents, it is necessary in this invention to dissolve in the solvents a fluoroaliphatic radical-containing polymer. The amount of polymer so employed will be such as to provide a solution having a viscosity at 100° C. of about 2 to 5 centistokes, preferably about 2.5 to 3 centistokes. Lower viscosity solutions will be relatively difficult to retain in the seal section and higher viscosity solutions will tend to cause power loss and provide relatively inadequate heat transfer. Generally, the solution will contain 3 to 10 weight percent of the polymer, and usually about 5 weight percent.

The fluoroaliphatic radical, $R_f$, in the polymer dissolved in the fluorinated solvent can have a large number of carbon atoms. Compounds where $R_f$ is not more than 20 carbon atoms will be adequate and preferred since large radicals usually represent a less efficient utilization of fluorine than is possible with smaller $R_f$ radicals. Generally, $R_f$ will have 4 to 20 carbon atoms, preferably 6 to about 12 and will contain 40–76 weight percent, preferably 50–76 weight percent of fluorine. The skeletal chain of the fluoroaliphatic radicals can be straight chained, branched chain or cyclic and can include catenary oxygen and/or trivalent nitrogen hetero atoms bonded only to carbon atoms, such hetero atoms providing stable linkages between fluorocarbon groups and not interfering with the inert character of the radical. The polymer must be free of functional groups of an acidic nature, such as hydroxyl, carboxyl, sulfonate, and the like and must contain less than about 10 atom percent chlorine (or bromine) to avoid hydrocarbon solubility. The presence of internal linking groups, such as —CONH— or $$-SO_2NH-$$

in the polymer is usually undesirable since polymers containing such linking groups will tend to be insufficiently soluble in the fluorinated solvent.

A preferred polymer used in this invention is one obtained upon the copolymerization of a compound of the formula $R_f(CH_2)_mO_2CC(R_1)=CH_2$ with comonomer of the formula $R_2SR_3O_2CC(R_1)=CH_2$, in which $R_f$ is a fluoroaliphatic radical of the type described above, containing less than 10 atom percent chlorine and less than 10 atom percent of hydrogen. $R_f$ may terminate in a —$CF_2H$ group but in order to provide the required 50 weight percent carbon-bonded fluorine in the polymer, $R_f$ should contain at least three fully fluorinated carbon atoms and may include as many as 20 or more carbon atoms, limited only by the availability of suitable starting material. Subscript $m$ is an integer varying from 1 to 5, and is preferably 1 or 2, to provide a thermally stable structure. $R_1$ can be hydrogen but preferably is a methyl group since the methacrylates will result in a significantly more thermally stable polymer. $R_2$ is a hydrocarbyl radical, such as a lower alkyl, alkoxy, or aryl radical of 1 to 8 carbon atoms, preferably 1 to 3 carbon atoms, and $R_3$ is a hydrocarbylene, such as an alkylene radical of 2 to 6 carbon atoms, preferably 2 or 3 carbon atoms, which can contain 1 to 3 catenary oxygen or sulfur atoms.

The relative amounts of the two monomers employed in preparing the polymer is such that the sulfur-containing co-monomer is incorporated in the polymer to the extent of at least 0.25 weight percent, preferably 0.5 to 1.5 weight percent; incorporation of more than about 2 weight percent of the comonomer in the polymer is difficult to obtain and does not provide any significant additional stability. Other vinyl comonomers can be included in the copolymer so long as the total fluorine content of the polymer is at least 50 weight percent. Such additional comonomers must be free of other functional groups and have about the same thermal stability as the above-described sulfur-containing comonomer, or greater stability.

Representative fluorinated acrylates and sulfur-containing acrylate comonomers which can be copolymerized to provide the fluoroaliphatic-radical containing polymers used in this invention include $$C_3F_7CH_2O_2CC(CH_3)=CH_2,$$
$$H(CF_2)_{10}CH_2O_2CC(H)=CH_2,$$
$$(CF_3)_2CFOCF_2CF_2CH_2CH_2O_2CC(CH_3)=CH_2,$$

$C_3F_7(OCF(CF_3)CF_2)_4OCF(CF_3)$
$$CH_2O_2CC(CH_3)=CH_2,$$

cyclo-$C_6F_{11}CF_2CF_2CH_2O_2C(CH_3)=CH_2,$

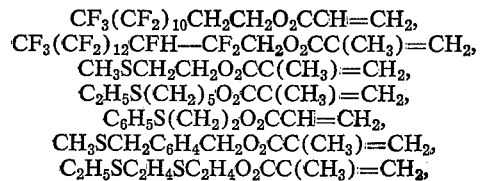

$$CF_3(CF_2)_{10}CH_2CH_2O_2CCH=CH_2,$$
$$CF_3(CF_2)_{12}CFH-CF_2CH_2O_2CC(CH_3)=CH_2,$$
$$CH_3SCH_2CH_2O_2CC(CH_3)=CH_2,$$
$$C_2H_5S(CH_2)_5O_2CC(CH_3)=CH_2,$$
$$C_6H_5S(CH_2)_2O_2CCH=CH_2,$$
$$CH_3SCH_2C_6H_4CH_2O_2CC(CH_3)=CH_2,$$
$$C_2H_5SC_2H_4SC_2H_4O_2CC(CH_3)=CH_2,$$

and $$C_2H_5SC_2H_4OC_2H_4O_2CC(CH_3)=CH_2.$$

The polymer can be prepared by any of the conventional methods suitable for the preparation of soluble acrylate or methacrylate polymers, but solution polymerization is preferred (emulsion polymerization tends to produce polymers which have too high a molecular weight to provide adequate solubility in the flourinated solvent). The polymer as initially prepared generally will require stabilization to obtain optimum stability. Such stabilization can be obtained, for example, by heating the polymer in solution, for example, 4 hours at 150° C., to remove unstable components and obtain a solution with a relatively constant viscosity after aging at elevated temperatures. Polymerization is preferably carried out in the fluoroinated solvent, using for example, a total monomer concentration of about 10 weight percent. After stabilization by heating, the polymerization product can then be diluted with additional fluorinated solvent to obtain the desired viscosity of 2–5 centistokes at 100° C. and provide a solution containing 3 to 10 weight percent of the stabilized polymer, preferably about 5 weight percent.

Homopolymers of fluorinated acrylates or methacrylates or sulfur-free copolymers have been found to provide solutions which decrease in viscosity during aging at elevated temperatures. Copolymers of the fluorinated acrylates or methacrylates with sulfur-containing acrylates or methacrylates similarly provide such unstable solutions unless stabilized. For a polymer solution to have the stability necessary in this invention, a solution having an initial viscosity of about 6 centistokes at 100° C. should not change in viscosity by more than 10 percent after aging in the presence of air for 150 hours at 125° C.

As an example of the preparation of a polymer useful in this invention, 19.8 parts by weight of fluorooctyl methacrylate, $C_7F_{15}CH_2O_2CC(CH_3)=CH_2$, and 0.2 part ethylthioethyl methacrylate, $$C_2H_5SC_2H_4O_2CC(CH_3)=CH_2$$

were copolymerized in 180 parts of a fluorocarbon solvent, $C_{12}F_{20-26}$ (FC-48) in the presence of 1.0 part azobisisobutyrolnitrile catalyst at 75° C. for about 16 hours. The polymerization product contained 9 weight percent solids. After stabilization by heating for one hour at 150–155° C. the product contained 8.7 weight percent solids.

Further stabilization for 4 hours and then for 8 hours at these temperatures resulted in the product containing 8.8 weight percent solids. Further fluorocarbon solvent (FC-48) was added to provide solutions containing 4,5, 4.6, and 4.9 weight percent polymer and these solutions were aged at elevated temperatures and their viscosities then measured at 100° C. These measurements are summarized below:

TABLE I

| Aging time and temp. | Visc. meas. of soln. (cs. at 100° C.) | | |
|---|---|---|---|
| | 4.5 wt. percent | 4.6 wt. percent | 4.9 wt. percent |
| 1 hr. at 99° C | 2.14 | 2.24 | 2.49 |
| +16 hrs. at 122-125° C | 2.13 | 2.24 | 2.48 |
| +64 hrs. at 122-125° C | | 2.25 | 2.46 |
| +70 hrs. at 122-125° C | | 2.23 | 2.45 |
| +16 hrs. at 99° C | | 2.26 | 2.47 |

The above data show no significant change in viscosity of the solutions after aging them as indicated.

Referring now to the drawing, where certain elements have been repositioned for clarity, there is schematically illustrated one embodiment of submersible pump motor seal section generally designated 11 which is illustrative of the features of the present invention. Seal section 11 seal section generally designated 11 which is illustrative of the features of the present invention. Seal section 11 is similar to that described in said U.S. Pat. 3,502,919 (with the exceptions hereinafter noted) and reference is made to that patent for mechanical details omitted herein for purposes of brevity.

As illustrated, the seal section is disposed intermediate a submersible pump 13 and a submersible pump motor 15 which are drivingly connected by a common operating shaft 17 extending through the seal section. The seal section is adapted to prevent ingress of ambient well fluid along the operating shaft 17 into the pump motor 15 and accommodates volume changes of the motor fluid to temperature changes experienced by on-and-off cycling of the motor.

The seal section 11 includes a tubular housing 19 having its upper end connected to a seal retainer 21 and a lower end connected to a partition member 23. Tubular housing 19 extends from the partition member 23 and is secured to a connector head 26. These members are all axially aligned in surrounding relation to the shaft 17 and connected in essentially fluid-tight relation by any convenient method of fastening such as by threaded arrangement or by welding or the like.

A support tube 27 having an internal diameter larger than the diameter of the operating shaft 17 is disposed in surrounding relation to the shaft and defines an annular passage 28. The tube 27 is supported at its lower end in the partition member 23. It is supported at its upper end by a journal bearing 29 secured to the seal retainer 21. In addition, a plurality of sleeve type journal bearings 31 are disposed along the shaft which are affixed to the support tube 27 and serve to rotatably support the shaft 17.

The tubular housing 19 includes a thrust bearing assembly 33 which serves to rotatably support the shaft 17 against axial thrust and, in addition, provides for circulation of motor fluid associated with the motor 15. In this regard, the shaft 17 is provided with an axial internal bore 34 which communicates with the fluid present in the motor 15.

The passage 34 communicates, in turn, with a lateral passage 36 in the thrust bearing assembly 33. Motor fluid passes from the motor through the passage 34 and radially outwardly through the passage 36 to the lower inner surface of the tubular housing 19. The fluid then passes downwardly along the low inner surface of the tubular member 19 through spiral grooves 37. The circulated fluid then passes radially inwardly through ports 39 and passes downwardly between the shaft 17 and the connector head 26 and returns to the motor 15. Since the outer peripheral surface of the tubular housing 19 is exposed to ambient well fluid and the inner surface of the tube is exposed to the circulated motor fluid, heat transfer occurs through the tubular member and generated motor heat is dissipated to the well.

A second lateral passage 41 is provided in the shaft to allow motor fluid to pass from the axial internal bore 34 to the annular passage 28 defined by the shaft 17 and support tube 27. The sleeve type journal bearings 29 and 31 include appropriately formed grooves which allow free passage of motor fluid along the shaft within the annular passage 28. The outer surface of the support tube 27 and the inner surface of the tubular housing 19 define an elongated annular chamber 43 having an upper end defined by the seal retainer 21 and a lower end defined by the partition member 23.

A passage 44 provides communication between the annular passage 28 and the chamber 43 at the upper end of the chamber. Therefore, the chamber 43 is in direct fluid communication with the motor 15 through the annular passage 28, lateral passage 41, and axial internal bore 34. In this manner, any expansion of motor fluid experienced due to increased temperature of the fluid will cause movement of the fluid upwardly thorugh the annular passage 28 into the chamber 43. Conversely, any contraction of the motor fluid due to a reduction in motor fluid temperature will cause movement of motor fluid from the chamber 43 downwardly through the annular passage 28 to the motor.

The chamber 43 is divided into a radially inner portion 45 and a radially outer portion 47 by a tubular member 49 disposed concentrically of the tubular housing 19 and support tube 27. Tubular member 49 is secured to a seal retainer 21 and extends downwardly and terminates in an open lower end 50 adjacent the partition member 23 in closely spaced relation thereto. As can be seen, therefore, the annular passage 28 is in communication with the radially inner portion 45 of the chamber 43 through the passage 44. The radially inner and radially outer portions 45, 47, respectively, of the chamber 43 are in communication with each other intermediate the open end of the tubular member 49 and the partition member 23.

An open upper end 51 of the seal retainer 21 is connected to the pump by means (not shown) and in addition is in direct communication with the ambient well fluid.

A plurality of rotary seals geerally designated 55, 56 and 57 are provided within the seal retainer 21. They are disposed in surrounding relation to the shaft 17 and provide an essentially fluid tight seal between the rotating shaft and the non-rotating seal section 11. By this arrangement, described in more detail in said U.S. Pat. No. 3,502,919, ambient well fluid is effective separated from the motor 15 and is precluded from passing along the shaft 17.

The rotory seals 55, 56, and 57 effectively form three separate chambers surrounding the shaft 17 within the seal retainer 21. The first of these chambers, designated 69, is formed above the uppermost seal 55 between that seal and the open end 51 of the retainer. It is therefore open to ambient well fluid.

The second chamber designated 71 is formed between the seals 55 and 56. The third chamber designated 73 is formed between the seals 56 and 57. It is noted that the annular passage 28 is in communication with the lower side of the lowermost rotary seal 57.

A bore 75 in the seal retainer 21 defines a conduit communicating between the chamber 69 and the upper end of the radially outer portion 47 of the chamber 43. A bore 77 formed in the retainer 21 communicates with the chamber 71 formed between the seals 55 and 56. A tube 78 is secured to the seal retainer 21 in communication with the bore 77 and extends downwardly through the radially inner portion 45 of the chamber 43 and terminates in an open lower end aligned with the open lower end 50 of the tubular member 49. Similarly, a bore 79 was provided in seal retainer 21 which is in communication with the chamber 73 formed between the seals 56 and 57. A tube 80 is secured to the seal retainer 21 in communication with the bore 79 and extends downwardly through the radially inner portion 45 of the chamber 43 terminating in an open lower end axially aligned with the open lower end 50 of the tubular member 49. (Tubes 78 and 80 are actually disposed as shown in FIG. 2 but have been repositioned in FIG. 1 for purposes of clarity.)

As can be seen, the tubes 78 and 80, which communicate with the chambers 71 and 73, respectively, have a cross-sectional area of the radially outer portion 47 of the chamber 43 which, in effect, defines a conduit in fluid communication with the uppermost chamber 69 through the bore 75. It is only necessary that the tubes 78 and 80 be large enough to allow the passage of fluid.

At assembly, the entire submersible pump motor seal section 11 is filled with the motor fluid of this invention. This is accomplished by connecting the seal section 11 with the motor 15 and filling both units with fluid through a filler port (not shown) in the motor. The fluid passes into the seal section 11 through the axial internal bore 34, lateral passage 41, and annular passage 28. A vent port 86 in communication with the chamber 43 is provided in the seal retainer 21 which accommodates venting of the chamber as the unit is filled. Similarly, chambers 71 and 73 are provided with vent ports 87 and 88, respectively.

(Since an intermediate fluid is not needed in the seal section of this invention, an intermediate fluid check valve and filler port, described in said U.S. Pat. No. 3,502,919, can be dispensed with.)

As the motor 15, pump 13, and seal section 11 are lowered into the well, there is, generally speaking, an increase in temperature due to the higher ambient temperature experienced at the bottom of the well. This increase in temperature causes expansion of motor fluid within the motor 15 as well as expansion of the motor fluid within the seal section 11. The fluid expansion causes fluid to be discharged outwardly through the radially outer portion 47, bore 75, chamber 69, and then open end 51. As expansion continues, motor fluid present in the radially outer portion 47 of the chamber 43 will attempt to urge the interface 85 between the motor fluid and well fluid upwardly.

When the motor is operated there will be an additional increase in temperature causing further expansion of the motor fluid and the interface 85 will be urged further upward. When the operating motor and seal assembly have reached the maximum operating temperature, the interface 84 will attain a stabilized position in outer radial portion 47.

When the motor is shut off, the temperature of the motor fluid within the motor and seal section will drop to approximately the temperature of the well fluid and there will be a reduction in volume of the motor fluid. Reduction in volume will cause motor fluid to move downwardly in the annular passage 28. A corresponding upward movement of motor fluid will be experienced in the radially inner portion 45 of the chamber 43. This, in turn, will cause downward movement of the motor fluid in radial outer portion 47 and downward movement of interface 85. Well fluid will then enter the open upper end 51 of the chamber 69 and travel downward through the bore 75 into radially outer portion 47 of the chamber 43. Subsequent on-and-off cycling of the motor 15 will cause the interface 85 to move upwardly and downwardly within the radially outer portion 47 of the chamber 43.

The volume of the radially outer portion 47 is such that sufficient motor fluid is retained in the radially outer portion to prevent movement of the inteface 85 into the radially inner portion 45 of the chamber 43 during off cycles of the motor.

In the embodiment illustrated, the volume of the radially inner and radially outer portions of the chamber 43 are approximately equal. While this is a satisfactory arrangement, it is only necessary that the volumes be large enough to insure retention of the interface 85 in the radially outer portion during off cycles of the motor.

Should failure of one or more of the rotary seals 55, 56, and 57 occur, ambient well fluid is precluded from contacting the motor windings because it has a lower density than and is insoluble in the novel motor fluid of this invention, and leaked well fluid will be restricted to the top portion of the seal section, e.g. at the upper end of tube 49.

Various modifications and alterations of this invention will become apparent to those skilled in the art without departing from the scope and spirit of this invention, and it should be understood that this invention is not to be unduly limited to the illustrative embodiment set forth herein.

What is claimed is:

1. A solution of about 3 to 10 weight percent of a hydrocarbon insoluble, fluoroaliphatic radical-containing polymer dissolved in a stable, normally liquid inert, nonpolar, oleophobic and hydrophobic, highly fluorinated, saturated organic compound or mixture of such compounds, said solution being thermally stable, insoluble in and chemically resistant to brine and motor oil, having a minimum boiling point of about 120° C., and having a viscosity at 100° C. which remains substantially constant at 2 to 5 centipoises when said solution is heated in air for 150 hours at 125° C., said polymer being a copolymer of a fluorinated acrylate having the formula $$R_f(CH_2)_mO_2CC(R_1)=CH_2$$

and a sulfur-containing acrylate comonomer having the formula , where $m$ is an integer of 1 to 5; $R_1$ is hydrogen or methyl, $R_2$ is hydrocarbyl radical, $R_3$ is a hydrocarbylene radical, and $R_f$ is an inert fluoroaliphatic radical having 4 to 20 carbon atoms at least three of which are fully fluorinated, 40 to 76 weight percent fluorine, and less than 10 atom percent hydrogen or chlorine, said polymer having at least 50 weight percent fluorine, said highly fluorinated saturated organic compound containing about 50 to 76 weight percent carbon-bonded fluorine and less than about 10 atom percent hydrogen or chlorine on the basis of fluorine content.

2. The solution of claim 1 wherein said comonomer is incorporated into said polymer to the extent of 0.5 to 1.5 weight percent.

3. The solution of claim 2 wherein said copolymer is a copolymer of fluorooctyl methacrylate and ethylthioethyl methacrylate, and said solvent is a $C_{12}F_{20-26}$ fluorocarbon.

4. The solution of claim 3 wherein $R_2$ has 1 to 8 carbon atoms and $R_3$ has 2 to 6 carbon atoms.

5. The solution of claim 2 wherein $R_1$ and $R_2$ are methyl and $R_3$ is ethylene.

6. A submersible pump motor seal section which prevents the ingress of ambient well fluid into the motor along an operating shaft and accommodates expansion and contraction of lubricating and cooling fluid in the motor occasioned by temperature changes of the fluid due to on-an-off cycling; said seal section including an elongated housing surrounding the operating shaft, at least one rotary seal providing essentially fluid tight seal between said housing and the shaft, said housing defining a chamber having a lower end and an upper end adjacent said seal, said chamber further including a radially inner portion and a radially outer portion which are in fluid communication adjacent said lower end of said chamber, said radially inner portion containing motor fluid and being in communication with the motor adjacent said upper end of said chamber, said radially outer portion being open adjacent said upper end of said chamber to ambient well fluid present above said rotary seal said motor fluid filling a portion of said radially outer portion of said chamber and defining an interface with said ambient well fluid therein, the volume of said motor fluid in said radially outer portion being sufficient to prevent movement of said interface from said radially outer portion into said radially inner portion upon contraction of said motor fluid during off cycles of said motor, said motor fluid comprising the solution of claim 1.

References Cited
UNITED STATES PATENTS

| | | | |
|---|---|---|---|
| 2,992,991 | 7/1961 | West | 252—58 X |
| 2,628,958 | 2/1953 | Bittles | 252—54.6 X |
| 3,502,919 | 3/1970 | Boyd et al. | 310—87 |
| 2,583,588 | 1/1952 | Mosteller | 252—54.6 X |
| 2,915,471 | 12/1959 | Lorensen | 252—58 X |
| 3,182,214 | 5/1965 | Boyd | 310—87 |
| 3,413,226 | 11/1968 | Coleman | 252—54.6 |

DANIEL E. WYMAN, Primary Examiner

W. H. CANNON, Assistant Examiner

U.S. Cl. X.R.

252—48.4; 260—79.7; 310—87

UNITED STATES PATENT OFFICE
CERTIFICATE OF CORRECTION

Patent No. 3,770,635          Dated Nov. 6, 1973

Inventor(s)  Jorge B. Atendido and Robert L. Hansen

It is certified that error appears in the above-identified patent and that said Letters Patent are hereby corrected as shown below:

Column 1, line 4, "Robart" should read -- Robert --;

Column 5, line 4, "4,5" should read -- 4.5 --;

Column 5, delete lines 26 and 27;

Column 6, line 25, "thorugh" should read -- through --;

Column 7, line 54, "84" should read -- 85 --;

Column 8, line 25, "normally liquid" should be followed by a comma;

Column 8, line 55, "claim 3" should read -- claim 2 --.

Signed and sealed this 9th day of April 1974.

(SEAL)
Attest:

EDWARD M.FLETCHER,JR.
Attesting Officer

C. MARSHALL DANN
Commissioner of Patents